United States Patent [19]

Harris

[11] 4,232,293
[45] Nov. 4, 1980

[54] LINE INTERFACE UNIT FOR VOICE AND WIDE BAND SIGNAL COUPLING

[75] Inventor: Harold H. Harris, Ottawa, Canada

[73] Assignee: Northern Telecom Limited, Montreal, Canada

[21] Appl. No.: 76,148

[22] Filed: Sep. 17, 1979

[30] Foreign Application Priority Data

Jul. 27, 1979 [CA] Canada .................................... 332660

[51] Int. Cl.³ ...................... H04M 11/00; H04Q 3/14; H04B 3/42
[52] U.S. Cl. ............................... 340/147 R; 179/1 C; 179/2 DP; 179/2 C; 179/81 R; 370/27
[58] Field of Search .................... 340/147 R; 179/5 R, 179/2 DP, 2 C, 2.5, 84 F, 1 C, 6.3 R, 81 R, 81 B, 18 FA, 170 R; 370/27

[56] References Cited

U.S. PATENT DOCUMENTS

| | | | |
|---|---|---|---|
| 3,955,051 | 5/1976 | Bitzer et al. | 179/2 DP |
| 4,019,149 | 4/1977 | Blomenkamp | 179/84 UF |
| 4,100,373 | 7/1978 | Perkins | 179/1 C |
| 4,103,112 | 7/1978 | Korsky | 179/81 R |
| 4,119,815 | 10/1978 | Frankfort et al. | 179/5 R |
| 4,149,030 | 4/1979 | Foreman | 179/2 DP |

Primary Examiner—Donald J. Yusko

[57] ABSTRACT

A line unit interfaces voice band signals and wide band signals extending from D.C. into the voice band between an analog line and a digital telecommunication facility. The line unit includes an analog to digital converter, a control circuit for generating one of two control signals and a line circuit. The line circuit includes a hybrid circuit in a first signal path for carrying voice band analog signals, and a second signal path for carrying wide band analog signals from the analog line. The signals in either signal path are transmitted to the analog to digital converter for encoding by way of a first switch or a second switch connected in series with the first and second signal paths respectively. The first and second switches are alternately conductive in response to one or the other of the control signals respectively.

5 Claims, 1 Drawing Figure

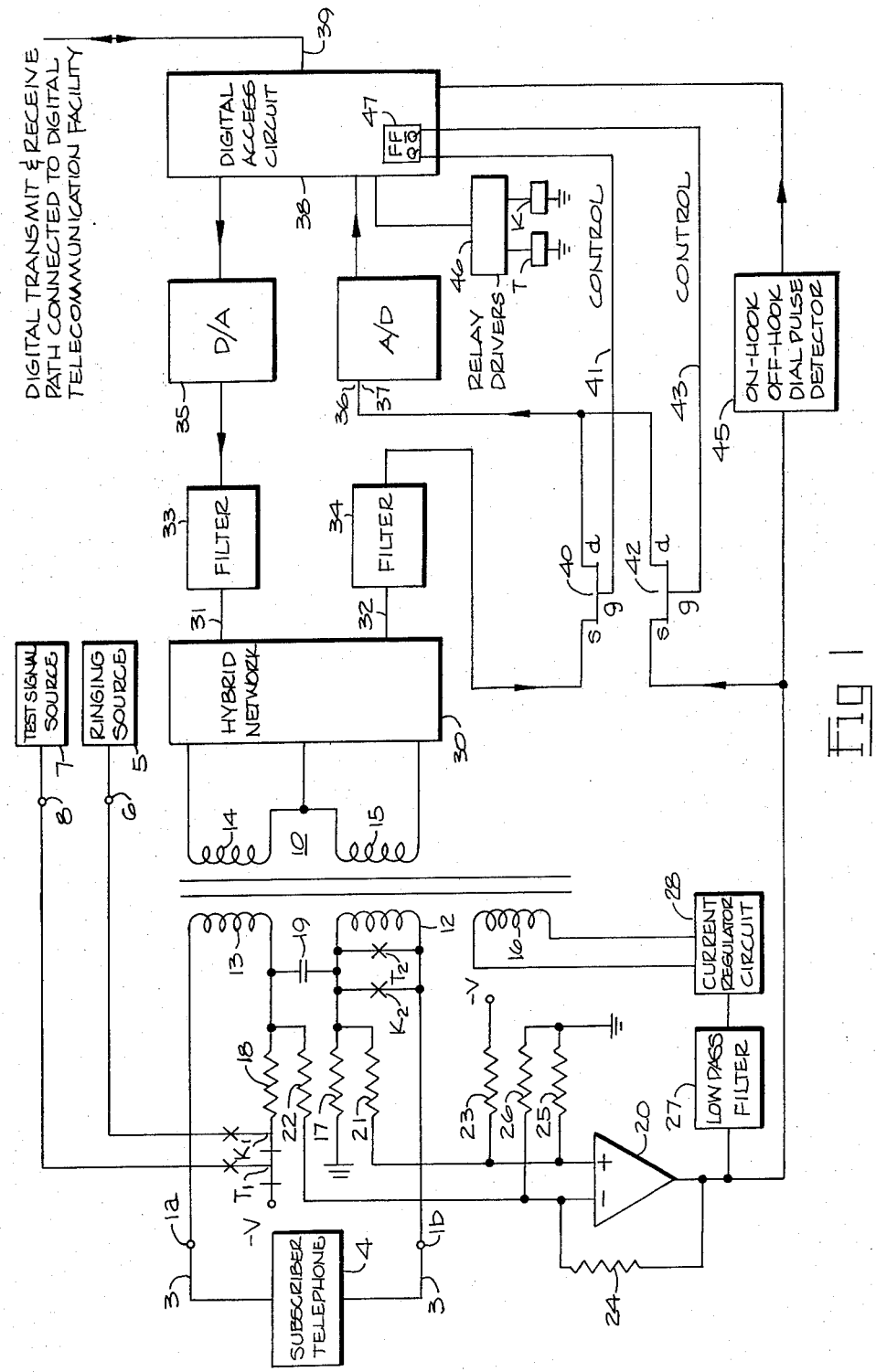

LINE INTERFACE UNIT FOR VOICE AND WIDE BAND SIGNAL COUPLING

The invention relates to communication systems and more particularly to a line unit for interfacing an analog line with a digital telecommunication facility.

A digital telecommunication facility for example a time division multiplex (TDM) pulse code modulation (PCM) telephone switching office, is well suited for passing and utilizing binary signal streams organized in a precisely defined format. Analog subscriber lines associated with the switching office are typically connected therewith by means of interface circuits; each interface circuit including analog and digital signal ports for providing voice band communication with the switching office. The aforementioned interface circuit is typically referred to as a line unit. The line unit includes both analog to digital, and digital to analog converters. The converters are coupled between a hybrid line circuit in an analog portion of the line unit and a digital access circuit or multiplexer in a digital portion of the line unit. One example of such an arrangement is disclosed in Canadian Pat. No. 1,051,998, entitled "A TDM PCM Communication System", issued on Apr. 3, 1978 to B. R. Barrett et al. An example of a line circuit suitable for use in a line unit is disclosed in U.S. Pat. No. 4,103,112, entitled "Telephone Line Circuit With Differential Loop Current Sensing and Compensation", issued on July 25, 1978 to V. V. Korsky.

In a line unit, functions related to the operation of the analog line such as the application and withdrawal of high level ringing signals, and the recognition of ON hook, OFF hook and dial pulsing states of the analog line, have typically been performed by dedicated circuitry in the line unit. This dedicated circuitry is somewhat similar in operation to that in past common control analog switching offices. This dedicated circuitry is typically autonomous in function, as for example in the performance of the withdrawal of ringing from the line, typically referred to as a ring trip function, or partially dependent in function upon a periodic poling or scanning function of the associated switching office, as for example in the recognition of dial pulse information. Signals communicating these functions to the switching facility have been routed via paths, space separated with respect to the voice band communication paths or channels.

Recently, it has been recognized that an improvement in the digital telecommunication facility is achieved by sharing the voice band digital transmission path associated with an analog line, between the encoded representations of voice band signals from the analog line and encoded signals corresponding to direct current conducted by the analog line. In one example, a time shared ring trip function is disclosed in U.S. Pat. No. 4,007,334 entitled "Time Division Digital Local Telephone Office with Telemetering Line Unit", issued on Feb. 8, 1977 to H. S. McDonald. In this example, telephone voice band analog signals are coupled from the subscriber analog line to an analog input of an analog to digital (A/D) converter in a conventional manner via a first signal path including a hybrid line circuit and a low pass filter. A second signal path, referred to as a "telemetric" path includes a current senser, which is coupled to the line and which generates a signal representation of net line current. This signal representation is filtered by a low pass filter having a cutoff frequency of 40 Hz and is transmitted around the hybrid circuit, via a switch, to the analog input of the A/D converter. When the switch is turned on, essentially net line direct current signal representations are encoded by the A/D converter along with any voice band signals from the hybrid circuit for use in the digital telephone office. The low pass filter is required to provide frequency separation between the voice band signals and line current signal representation. As the first and second signal paths pass only signals in mutually exclusive frequency ranges, voice voice band analog signals, which would otherwise cause ambiguous results at the A/D converter, are prevented from also passing along the second path. The encoded signal from the A/D converter is conventionally multiplexed into the binary signal bit stream format of the operating digital office and is available to be routed to a digital circuit located remote from the line unit in the switching office. The digital circuit is time shared among a group of line units and controls the ring trip function of each of the line units.

In a line unit with a resistive feed network similar to that disclosed by V. V. Korsky, energizing current having a wide frequency range from direct current through the voice band can be supplied via the resistive feed network. In an operating telephone system, analog line testing and maintenance includes energizing the analog line with a transient voltage and/or continuous AC signals. One such test, useful in determining the number of ringers associated with a telephone subscriber line, is the well known ballistic test. This test involves direct current and voice band frequencies. In this test the analog line loading response to the application of a transient voltage impulse is monitored. It would be convenient to be able to telemeter the analog line loading response to this test into the associated digital facility. The telemetric path disclosed by H. S. McDonald is, however, unsuitable for this use because it is essential that it be severely band limited in order to operate compatibly with the remainder of the line unit.

In accordance with the present invention, a line unit is provided with a broad band telemetric path for bypassing signals from an analog line around a voice band hybrid line circuit. Signals from a sensing means and signals from the output of the hybrid line circuit are time switched by way of respective transmission switches which are controlled to couple either one or the other of the signals to an analog input of an analog to digital converter at any one time. The line unit provides for a common control ring trip function and additionally at no extra cost provides an essential link to facilitate test and maintenance procedures.

The invention resides in a line unit for interfacing an analog line with a digital telecommunication facility. The line unit comprises an analog to digital converter having an analog input for receiving analog signals for encoding. A control means generates one of a plurality of control signals at any one time, in response to directions received in the line unit by way of the telecommunication facility. A line circuit, in the line unit, includes a first signal path having a hybrid circuit for connection to the analog line and for carrying a voice band analog signal, and a second signal path for carrying another analog signal. A first switch is connected in series between an analog output of the hybrid circuit in the first signal path and the analog input of the A/D converter. The first switch is responsive to a first one of the control signals to couple the analog signal from the hybrid circuit to the encoder. A second switch is connected in series between the second signal path and the analog input of the A/D converter. The second switch is responsive to a second one of the control signals to couple the other analog signal to the converter.

An example embodiment of the invention will now be described with reference to the accompanying schematic drawing of a telephone line interface unit. The illustration of the line interface unit in FIG. 1 is somewhat abbreviated in the interest of clarity and ease of understanding. Details and operating principles of circuit functions shown in block form are familiar in numerous variations to persons of normal skill in the art of electronic telephony. Various other details, for example the provision for various power supplies and clock timing signals, are not shown or described as these are not pertinent to an understanding of the invention. Likewise, a particular digital telecommunication facility with which the analog line is interfaced by the line unit is not illustrated or described.

The telephone line unit in FIG. 1 is connected across a two-wire analog line 3 at analog line terminals 1a and 1b and connected to the digital telecommunication facility through a digital transmit and receive signal path 39. The line unit includes a line circuit having a transformer 10 connected between a hybrid network 30 and the analog line terminals 1a and 1b. The two-wire analog line 3 is connected between the line terminals 1a and 1b and a subscriber telephone 4. The transformer 10 includes a split primary winding with first and second half windings 12 and 13 respectively. The first winding 12 is connected in series between ground and the terminal 1b via a resistor 17. The second winding 13 is connected in series between a source of d.c. power $-V$ and the other terminal 1a via a resistor 18 and break contact portions of relay transfer contacts K1 and T1. The resistors 17 and 18 are of similar ohmic value, for example about 200 ohms. At least one high level ringing signal source 5 associated with the telecommunication facility is normally connected for supplying energizing current to any of a plurality of line interface units. The ringing source 5 is connected to the resistor 18 through a terminal 6 and make contact portion of the relay transfer contact K1. A test signal source 7 associated with the telecommunication facility is also connected to supply energizing test current to any of the plurality of line interface units. The test signal source 7 is connected to the resistor 18 through a terminal 8, a make contact portion of a relay transfer contact T1 and through the break contact portion of the relay transfer contact K1. The resistors 17 and 18 comprise a resistive feed network through which energizing current is coupled from any of the sources $-V$, 5 or 7 to the analog line 3. A capacitor 19 is connected between the first and second windings 12 and 13 and provides a coupling path for voice band analog a.c. signals between the two windings 12 and 13. Relay make contacts K2 and T2 are connected across the first winding 12 and provide a low impedance coupling path across the primary winding in the event that either the high level ringing signal source 5 or the test signal source 7 is connected to the line unit. A switch, not shown is optionally inserted in series with the capacitor 19. In one example the switch is provided by a break contact of the relay T, which when operated eliminates the loading effect of the capacitor 19 during a period when the analog line 3 is energized from the test signal source 7. The transformer 10 includes a split secondary winding having first and second half windings 14 and 15 respectively. The secondary windings 14 and 15 in combination with the hybrid network 30 provide a two wire—four wire hybrid circuit in a first signal path which carries voice band analog signals from the analog line 3 to an analog input 37 of an analog to digital (A/D) converter 36. The hybrid network 30 includes a two-wire input port 31 connected to receive analog signals from a digital to analog (D/A) converter 35 via a voice band low pass filter 33. The hybrid network 30 also includes a two wire output port which is connected to an input of a voice band low pass filter 34. An output of the low pass filter 34 is coupled to the analog input 37 of the A/D converter 36 by way of transmission switch in the form of a field effect transistor (FET) 40. The FET 40 includes a source electrode s connected to the output of the filter 34, a drain electrode d connected to the analog input 37, and a gate electrode g used to control the conductivity of the FET 40 between the source and drain electrodes. A digital access circuit 38 is connected to the digital transmit and receive signal path 39. The digital access circuit is also connected to a digital input port of the D/A converter 35 and a digital output port of the A/D converter 36. The digital access circuit 38 includes circuitry (not shown) which interfaces the input/output timing requirements and format of the telecommunication facility with the operating requirements of the converters 35 and 36. In one example, the converters 35 and 36 are compatible with eight bit PCM words. However, each word transmitted to the digital access circuit 38 from the telecommunication facility contains at least nine bits, one of these bits being used to indicate that the remaining eight bits comprise either a PCM word for conversion to a corresponding analog signal level or a data word for use in supervisory control functions. In the case where the eight bits are designated as data by the ninth bit, this data is registered in the digital access circuit 38. Supervisory control functions are, for example, operation of either relays T or K via relay drivers 46, and control the state of a flip-flop 47 in the digital access circuit 38. The supervisory control functions are dictated by predetermined bits or combinations thereof in the data word.

The line circuit further includes a sensing circuit represented by circuit elements 20 to 26 inclusive. An amplifier 20 in the sensing circuit operates to generate a signal proportional to the net current flow in the resistors 17 and 18 of the sensitive feed network. Similar to that described in the previously mentioned patent to V. V. Korsky, the output of the sensing circuit is coupled via a low pass filter 27 to a current regulator 28 which accordingly conducts a balancing current in a balance winding 16 in the transformer 10 to reduce d.c. flux in the core of the transformer 10. The proportional signal from the amplifier 20 is also connected to an ON-hook, OFF-hook and dial pulse detector 45. The detector 45 generates binary signals corresponding to the ON-hook, OFF-hook and dial pulsing state of the line 3 for use in the digital access circuit 38.

A second signal path carries the proportional signal from the amplifier 20 and includes a second transmission switch in the form of a FET 42. The FET 42 includes a source electrode s connected to the output of the amplifier 20 in the sensing circuit, a drain electrode connected to the analog input 37, and a gate electrode g used to control the conductivity of the FET 42 between the source and drain electrodes. The conductivity of each of the FETs 40 and 42 is controlled in complementary fashion by Q and Q outputs of the flip-flop 47.

Control signals from these outputs are coupled to the gate electrode g of the FETs 40 and 42 by control leads 41 and 43 respectively. Alternately, the control signals may be provided by a single control lead connected directly to one of the gate electrodes and with the second control signal being provided via an inverter connected from the one gate electrode to the other gate electrode.

In operation, with the control signal from the flip-flop 47 on lead 41 being asserted, voice band signals from the line 3 are coupled through the first signal path in the line circuit by way of the FET 40 to the analog input 37 of the A/D converter 36. PCM signal representations of the analog voice band signal are generated in the converter 36 and interfaced with the associated digital telecommunication facility by the digital access circuit 38. Wide band signals, including frequencies extending from direct current through the voice band inclusive, are available from the second signal path for encoding by the A/D converter 36. In the event that either of the relays T or K is activated to connect the test signal source 7 or the ringing source 5, the flip-flop 47 is set to assert the control signal on lead 43 and not on lead 41. The wide band signals are coupled on the second signal path from the amplifier 20 to the analog input 37 of the A/D converter 36 through the FET 42. PCM signal representations of the wide band analog signal are generated in the analog to digital converter 36 and interfaced with the associated telecommunication facility by the digital access circuit 38 in a manner similar to that for the voice band analog signal.

The encoded wide band signals are particularly useful in combination with the time shared digital circuitry (not shown), to which they are routed by the telecommunication facility to control the withdrawal of high level ringing signals in the event that the subscriber telephone goes OFF hook, and in the analyzing of line response to test signals. In one example of this function, wide band analog signals from the line 3 are encoded just prior to the connection of either of the test signal source 7 or the ringing source 5. These signals provide for the generation of a dynamic threshold adjustment, in the time shared digital circuitry, which is useful in correction for current leakage in the line 3 and various offset errors typically inherent in the analog circuitry portion of the line unit.

Additional wide band signal paths in the line unit will provide for telemetering of various line unit operation conditions via the digital telecommunication facility. By this means it is envisaged, for example, that the voltage levels of operating voltage supply lines, for feeding operating currents to the line unit, are also from time to time encoded by the A/D converter 36 for transmission to a remotely located, time shared, digital maintenance monitor circuit.

What is claimed is:

1. A line unit for interfacing an analog line with a digital telecommunication facility, the line unit comprising:
    an analog to digital (A/D) converter, having an analog input for receiving analog signals, for encoding said analog signals for use in the digital telecommunication facility;
    a control means for generating a plurality of control signals, one at any one time, in response to directions received in the line unit by way of the telecommunication facility; and
    a line circuit including:
    a first signal path for carrying a voice band analog signal and including a hybrid circuit for connection to the analog line;
    a second signal path for carrying a wide band analog signal in a frequency range extending from direct current into the voice band;
    a first switch connected in series between an analog output of the hybrid circuit in the first signal path and the analog input of the A/D converter, for coupling the analog signal from the hybrid circuit to the analog input in response to a first one of the control signals;
    a second switch connected in series between the second signal path and the analog input of the A/D converter, for coupling the analog signal on the second signal path to the analog input in response to a second one of the control signals.

2. A line unit as defined in claim 1, in which the line circuit further comprises:
    a line transformer in the hybrid circuit, the line transformer being for connection to the analog line and for coupling energizing power to the analog line;
    a resistive feed network connected to the line transformer for coupling the energizing power to the line transformer, the resistive feed network including terminals for connections across any one of a plurality of power sources, at any one time;
    a sensing means in the second signal path, the sensing means having an input port connected across the resistive feed network, the sensing means generating, in the second signal path, a signal directly proportional to a flow of energizing current through the resistive feed network;
    whereby in response to the first control signal, the voice band analog signal from the hybrid circuit is exclusively coupled to the analog input of the A/D converter, and in response to the second control signal the wide band analog signal is exclusively coupled from the sensing means to the analog input of the A/D converter.

3. A line unit as defined in claim 1 or 2 wherein each of said switches comprises a field effect transistor.

4. A line unit for interfacing an analog line with a digital telecommunication facility, the line unit comprising:
    an analog to digital (A/D) converter having an analog input for receiving analog signals for encoding said analog signals for use in the digital telecommunication facility;
    a control means for generating a plurality of control signals one at any one time, in response to directions received in the line unit by way of the telecommunication facility; and
    a line circuit including:
    a plurality of signal paths, at least one of the signal paths having a hybrid circuit for connection to the analog line and being limited to carrying voice band analog signals, at least one other signal path being for connection to the analog line and being capable of carrying a wide band analog singal extending from direct current into voice band frequencies, each of the signal paths being terminated at the analog input of the A/D converter;
    a plurality of transmission switches each of the transmission switches being connected in series with a corresponding one of the signal paths, each of the transmission switches being responsive to a corresponding separate one of the control signals from the control means for conducting the analog signal along its respective signal path to the analog input of the A/D converter.

5. A line unit as defined in claim 4 wherein each of said transmission switches comprises a field effect transistor.

* * * * *